Figure 1:
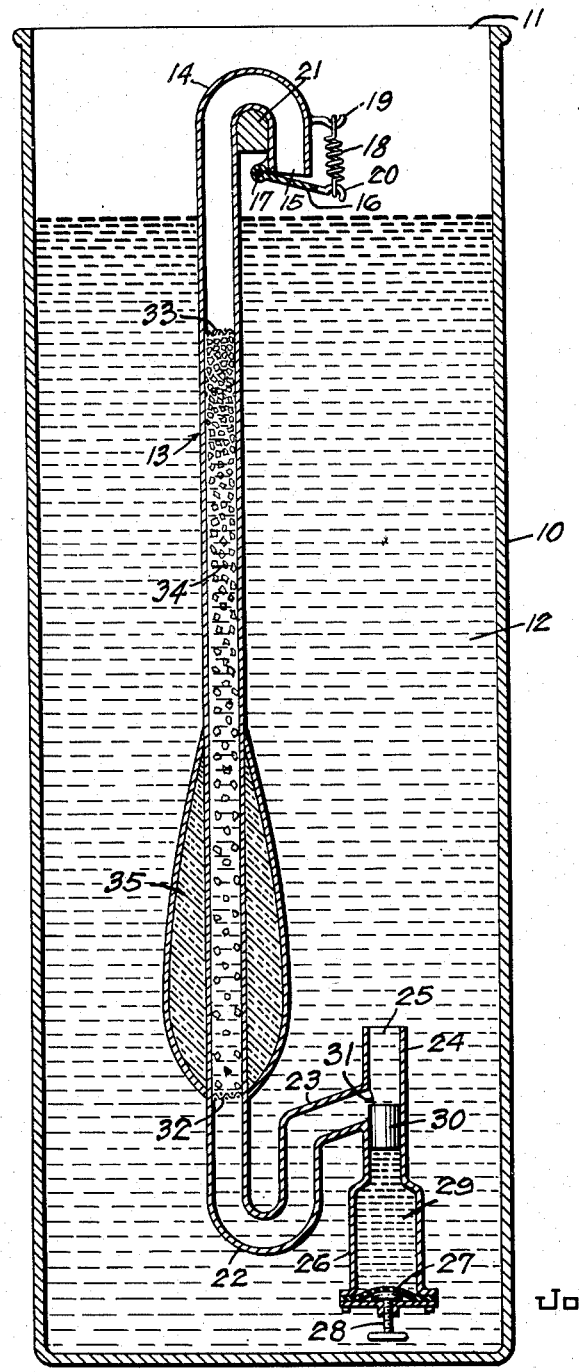

Feb. 3, 1953 — J. G. TSCHINKEL — 2,627,454
APPARATUS FOR HEATING HYDROGEN PEROXIDE
Filed Nov. 10, 1949

Inventor
Johann G. Tschinkel
By G. J. Kessenich & J. H. Church
Attorneys

Patented Feb. 3, 1953

2,627,454

UNITED STATES PATENT OFFICE 2,627,454

APPARATUS FOR HEATING HYDROGEN PEROXIDE

Johann G. Tschinkel, Fort Bliss, Tex., assignor to the United States of America as represented by the Secretary of the Army Application November 10, 1949, Serial No. 126,657

3 Claims. (Cl. 23—282)

(Granted under Title 35, U. S. Code (1952), sec. 266)

The invention described in the specification and claims, if patented, may be manufactured and used by or for the Government for governmental purposes without the payment to me of any royalty thereon.

This invention relates to an apparatus for heating hydrogen peroxide.

An object of the invention is to provide an apparatus for heating hydrogen peroxide especially adapted to the prevention of freezing of hydrogen peroxide in storage or use during cold weather.

Another object is to provide an apparatus that eliminates the necessity for supplying separate fuel for the heating devices.

Another object is to provide apparatus for heating hydrogen peroxide that is automatic in operation and will maintain a body of hydrogen peroxide at a preselected temperature in cold surroundings.

Still another object of the invention is to provide an apparatus for heating hydrogen peroxide that is simple and flexible and easy to use in the field.

These and other objects of the invention are realized in a process for heating hydrogen peroxide which includes withdrawing a portion of hydrogen peroxide from a body thereof, substantially decomposing the withdrawn portion of hydrogen peroxide to form water and oxygen with the liberation of heat, and transferring a substantial portion of the heat so liberated to the main body of hydrogen peroxide.

In its apparatus aspects, the invention resides in a device for heating a body of hydrogen peroxide including a substantially closed decomposition chamber adapted to contain hydrogen peroxide decomposition catalyst, the chamber being substantially submergible in a body of liquid hydrogen peroxide, inlet means admitting hydrogen peroxide into the chamber when the latter is substantially submerged in a body of hydrogen peroxide, means controlling the admission of hydrogen peroxide into the chamber, and outlet means for discharging the products of decomposition of hydrogen peroxide from the chamber.

The decomposition chamber may take the form of a substantially straight tube having inlet means at one end thereof and outlet means at the other. The inlet means may be provided with a valve for controlling the admission of hydrogen peroxide into the tube and this valve may be thermostatically regulated. The outlet end of the tube may have a spring loaded valve through which the decomposition products of hydrogen peroxide are discharged.

Figure 2:
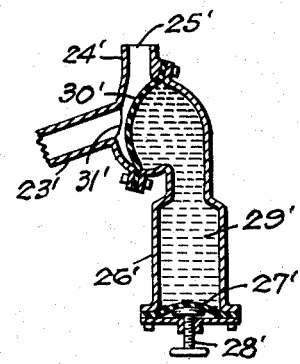

In the drawing:

Figure 1 is a vertical sectional view of one form of the heating device of the invention shown in operating position in a tank of hydrogen peroxide; and Figure 2 is a detail sectional view of another form of thermostatically controlled inlet valve.

Referring to the drawings, particularly to Fig. 1 thereof, the apparatus shown includes a tank 10 having an open top 11, the tank being substantially filled with hydrogen peroxide 12 of about 90% concentration and of a density of about 1.4 compared with water.

The heating device of the invention has an elongated tube 13 provided with a reverse bend 14 at the top and a top opening 15 closed by a valve 16 hinged to the tube at 17 and biased to closed position by a spring 18 tensioned between a hook 19 fixed to the tube and a hook 20 formed on the swinging end of the valve. The heating device is suspended in the body of hydrogen peroxide from a cross-bar 21 carried by the tank 10.

A reverse bend 22 is formed in the lower end of the tube 13 and a side arm 23 communicates with a short vertical length of tube 24 that is open at the top 25. A bulb 26 is formed in the lower end of the short length of tube 24 and a flexible diaphragm 27 is disposed in the bottom of the bulb and is peripherally sealed to the side walls of the bulb. An adjusting screw 28 is threaded in the bottom of the bulb and bears against the under surface of the diaphragm 27, whereby the effective internal volume of the bulb may be varied.

The bulb above the diaphragm is filled with mercury or oil 29 having a substantial volumetric coefficient of expansion and a piston 30 is floated on the surface of the liquid in the bulb. This piston fits the bore of the tube length 24 with a free sliding fit and is adapted, when raised by thermal expansion of the liquid 29 in the bulb, to block the entrance 31 to the side arm 23, thus preventing ingress of hydrogen peroxide from the tank into the tube 13. When the piston falls, due to thermal contraction of the liquid 29 in the bulb 26, the entrance to the side arm 23 is opened and hydrogen peroxide enters the tube 13.

Within the vertical portion of the tube 13 and supported between retaining screens 32 and 33 is a mass 34 of loosely packed granular hydrogen peroxide decomposition catalyst. The catalyst mass may include inert granular material and, as indicated in Fig. 1, the concentration of catalyst increases in the mass in a rising direction. Any of many well known catalysts that decompose hydrogen peroxide into water and oxygen may be used, such as sand, manganese dioxide, cobaltic hydroxide, or the like, either in the form of granules or carried on granular supporting material. The granular structure of the catalyst mass permits liquid to circulate through the mass.

In order to prevent localized overheating of the body of hydrogen peroxide, a layer of insulation 35 may cover the outside of the tube 13 about the zone of greatest heat liberation.

The heater is fabricated of inert materials that are not substantially corroded by hydrogen peroxide and that do not catalyse the decomposition of hydrogen peroxide; suitable structural materials are aluminum and stainless steel.

In operation, the valve adjusting screw 28 is set so that the valve 30—31 opens when the temperature of the bulb 26 falls below a preselected level, which level is safely above the freezing point of the hydrogen peroxide solution. The heater is then substantially submerged in a tank of hydrogen peroxide to be heated, the top outlet 15 being positioned somewhat above the surface of the hydrogen peroxide. When the temperature of the body of hydrogen peroxide falls below the level for which the valve is set, the valve 30—31 opens, and hydrogen peroxide enters the tube 13 through the bottom inlet and flares up and into contact with the decomposition catalyst mass 34. The hydrogen peroxide then is decomposed into water and gaseous oxygen with the liberation of substantial amounts of heat. The products of decomposition rise in the tube 13 and issue from the top opening 15, the oxygen passing off into the atmosphere and the water dripping back into the body of hydrogen peroxide. Where dilution of the main body of hydrogen peroxide is not desired, it is obvious that the water may be conducted outside of the tank for disposal.

The heat released by the decomposition reaction within the tube is transferred by conduction and convection to the body of hydrogen peroxide in the tank as well as by return to the main body of hydrogen peroxide of the hot water produced in the reaction chamber, thus warming the hydrogen peroxide.

When the temperature of the body of hydrogen peroxide rises above that for which the valve 30—31 is set, the valve closes shutting off flow of hydrogen peroxide into the heater tube 13 and interrupting the heating action. The heating action is started again upon a drop in the temperature of the body of hydrogen peroxide to a level at which the valve 30—31 opens. The heating action is automatic and maintains the body of hydrogen peroxide at a temperature within the range of control of the thermo-controlled valve.

Referring to Fig. 2 of the drawings, the thermo-controlled valve shown is similar to that described hereinbefore with reference to Fig. 1. Parts of the valve of Fig. 2 that correspond to those of the valve of Fig. 1 are designated by corresponding primed reference numerals.

The valve of Fig. 2 differs essentially from that of Fig. 1 in that it embodies a diaphragm as the movable valve element instead of a sliding piston. The use of a diaphragm positively separates the heat-sensitive liquid from the hydrogen peroxide and eliminates any possibility of intermixing of the two liquids.

As seen in Fig. 2, 30' is the flexible diaphragm. This diaphragm is clamped between the separate sections of the short tube length 24' and is positioned opposite to the reaction inlet 31'. The thermo-sensitive liquid 29' is confined in the zone between the diaphragm valve element 30' and the calibrating diaphragm 271 and cannot escape from this zone.

In operation, as the thermo-sensitive liquid expands with rising temperature, the diaphragm valve element 30' is pushed towards the inlet orifice 31' which orifice ultimately is closed by the diaphragm 30' thus interrupting heating action of the heating device of which the thermo-controlled valve is a part. The orifice 31' is opened as the temperature falls and the heating device resumes operation.

I claim:

1. Apparatus for exothermally and automatically controlling the temperature of a body of hydrogen peroxide, comprising, a container, a reaction chamber positioned in said container, said chamber being provided with an inlet at one end and an outlet at the other, opening from and emptying into said container, said chamber being arranged within said container to be at least substantially surrounded by the body of hydrogen peroxide and in heat exchange relation therewith, a normally-open valve controlling said inlet, heat responsive means automatically closing said valve in response to temperature rise above a predetermined value, said chamber being provided with supporting members, adapted to retain a catalytic material within said chamber.

2. In an apparatus for the exothermic heating of hydrogen peroxide, a container, a tube positioned in said container, having an inlet at one end and an outlet at the other, opening from and emptying into said container, said inlet being near the bottom of said container, and said outlet being near the top of said container, said tube being arranged within said container to be at least substantially surrounded by the body of hydrogen peroxide and in heat exchange relation therewith, a normally-open valve controlling said inlet, heat responsive means automatically closing said valve in response to temperature rise above a predetermined value, said tube being provided with supporting members, adapted to retain a catalytic material within said tube.

3. An apparatus according to claim 2 wherein the outlet end of the tube is provided with a normally-closed valve, automatically opened by and in response to pressure in said tube.

JOHANN G. TSCHINKEL.

REFERENCES CITED

The following references are of record in the file of this patent:

UNITED STATES PATENTS

| Number  | Name    | Date          |
|---------|---------|---------------|
| 418,275 | Cornell | Dec. 31, 1889 |
| 513,825 | Poulsen | Jan. 30, 1894 |
| 568,903 | Harris  | Oct. 6, 1896  |

(Other references on following page)

UNITED STATES PATENTS

| Number | Name | Date |
|---|---|---|
| 867,964 | Von Foregger | Oct. 15, 1907 |
| 904,886 | Müller | Nov. 24, 1908 |
| 1,202,199 | Lumiere et al. | Oct. 24, 1916 |
| 1,266,162 | Rosin | May 14, 1918 |
| 1,376,100 | Kendall | Apr. 26, 1921 |
| 1,668,371 | Kemmerich | May 1, 1928 |
| 1,860,837 | Howard | May 31, 1932 |
| 1,873,876 | Downs | Aug. 23, 1932 |
| 1,880,306 | Wulff | Oct. 4, 1932 |
| 1,948,635 | Sykes | Feb. 27, 1934 |
| 2,002,525 | Cambron | May 28, 1935 |
| 2,272,818 | Petroe | Feb. 10, 1942 |
| 2,407,882 | Hutchinson et al. | Sept. 17, 1946 |
| 2,485,542 | Abrams | Oct. 25, 1949 |

OTHER REFERENCES

"A Course in General Chemistry," by McPherson and Henderson, 3rd ed., pp. 89, 90. Ginn and Co., N. Y.

J. W. Mellor's "A Comprehensive Treatise on Inorganic and Theoretical Chemistry," vol. 1, 1922 ed., pp. 939–941. Longmans, Green and Co., N. Y.